(12) United States Patent  (10) Patent No.: US 10,843,585 B2
Chen  (45) Date of Patent: *Nov. 24, 2020

(54) AUTOMOBILE CHARGING SYSTEM

(71) Applicant: Qingshuang Chen, Shenzhen (CN)

(72) Inventor: Qingshuang Chen, Shenzhen (CN)

(73) Assignee: SHENZHEN DANSHA TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,181

(22) Filed: Aug. 15, 2019

(65) Prior Publication Data

US 2019/0366864 A1 Dec. 5, 2019

Related U.S. Application Data

(63) Continuation-in-part of application No. 15/359,585, filed on Nov. 22, 2016, now Pat. No. 10,427,534.

(51) Int. Cl.
  B60L 53/37 (2019.01)
  B60L 53/126 (2019.01)
  G06K 7/14 (2006.01)
  B60L 53/51 (2019.01)
  H04W 4/80 (2018.01)
  B60L 53/38 (2019.01)

(52) U.S. Cl.
  CPC ............. B60L 53/37 (2019.02); B60L 53/126 (2019.02); B60L 53/38 (2019.02); B60L 53/51 (2019.02); G06K 7/1417 (2013.01); H04W 4/80 (2018.02)

(58) Field of Classification Search
  CPC ........................................................ B60L 53/37
  USPC ........................................................ 320/109
  See application file for complete search history.

(56) References Cited

U.S. PATENT DOCUMENTS

| 6,359,718 B1* | 3/2002 | Lin ..................... G02B 26/0841 |
| | | 359/223.1 |
| 10,005,367 B2* | 6/2018 | Lee .......................... B60L 11/182 |
| 2008/0211914 A1* | 9/2008 | Herrera ..................... H04N 7/18 |
| | | 348/148 |
| 2008/0267441 A1* | 10/2008 | Bux .................... G01B 11/2755 |
| | | 382/100 |

(Continued)

FOREIGN PATENT DOCUMENTS

CN  202435147 U  9/2012
KR  20100097796 A  9/2010

Primary Examiner — Jerry D Robbins

(57) ABSTRACT

An automobile charging system includes: a photovoltaic battery panel installed at a bottom of a vehicle; a camera module; a first actuating device connected with the camera module; a light source; a second actuating device connected with the light source; and a controller being connected with the camera module, the first actuating device, the light source and the second actuating device. The controller is configured to control the first actuating device to rotate, and through the first actuating device control the camera module to capture a preset pattern disposed at the bottom of the vehicle. After the camera module has captured the preset pattern disposed at the bottom of the vehicle, the controller is configured to control the second actuating device to rotate accordingly so that the light source projects light to the photovoltaic battery panel and thereby charge the photovoltaic battery panel.

20 Claims, 3 Drawing Sheets

(56) References Cited

U.S. PATENT DOCUMENTS

| | | | |
|---|---|---|---|
| 2009/0045773 A1* | 2/2009 | Pandya | B60L 53/14 320/108 |
| 2009/0092284 A1* | 4/2009 | Breed | B60J 10/00 382/103 |
| 2011/0113609 A1* | 5/2011 | Berdelle-Hilge | B60L 53/80 29/426.1 |
| 2013/0085696 A1* | 4/2013 | Xu | B60L 3/12 702/63 |
| 2017/0001527 A1* | 1/2017 | Prokhorov | B60L 53/37 |
| 2017/0183095 A1* | 6/2017 | Liu | H02J 50/30 |
| 2017/0225582 A1* | 8/2017 | Augst | H02J 50/10 |
| 2017/0358944 A1* | 12/2017 | Salter | F21V 9/38 |

* cited by examiner

AUTOMOBILE CHARGING SYSTEM

CROSS-REFERENCE TO RELATED APPLICATIONS

This application is a continuation in part of U.S. non-provisional patent application Ser. No. 15/359,585 filed on Nov. 22, 2016; the contents of which are hereby incorporated by reference.

FIELD OF THE PATENT APPLICATION

The present patent application generally relates to automobile electronics and more specifically to an automobile charging system.

BACKGROUND

Hybrid powered vehicles and pure electric vehicles are being used more and more widely, while how to charge electric vehicles is a problem that must be solved. Traditional wired charging methods require the vehicle to be driven to a designated charging position, and then to be charged by an electric cable. Generally the cost for building charging stations to implement such wired charging is high. In addition, the fact that the number of such charging stations is relatively small and the coverage of the charging stations is limited causes inconveniences to users of the electric vehicles.

With the development of artificial intelligence technologies, full self-driving automobiles have gradually become possible, while traditional wired charging will not be able to meet the requirements of such full self-driving automobiles. Some wireless automobile charging system charge electric vehicles through electromagnetic induction, but this method needs to generate relatively high electromagnetic radiation inside and around the vehicles. If the driver and the passengers are inside the vehicle during charging, such relatively high electromagnetic radiation would tend to cause negative effects on their health.

SUMMARY

The present patent application is directed to an automobile charging system. In one aspect, the automobile charging system includes: a photovoltaic battery panel installed on a vehicle; a camera module; a first actuating device connected with the camera module; a light source; a second actuating device connected with the light source; and a controller being connected with the camera module, the first actuating device, the light source and the second actuating device. The controller is configured to control the first actuating device to rotate, and through the first actuating device control the camera module to capture a preset pattern on the vehicle. After the camera module has captured the preset pattern, the controller is configured to control the second actuating device to rotate accordingly so that the light source projects light to the photovoltaic battery panel and thereby charge the photovoltaic battery panel. The controller is configured to choose a first optimal charging scheme that is suitable to the photovoltaic battery panel based on the preset pattern captured by the camera module by analyzing the preset pattern, deriving model information of the photovoltaic battery panel from the preset pattern, searching in a first database and according to the search result obtaining and executing the first optimal charging scheme.

The photovoltaic battery panel may be installed at a bottom of the vehicle. The light source may be an infrared light source. The preset pattern may be disposed at a bottom of the vehicle. The camera module, the first actuating device, the light source, the second actuating device and the controller may be disposed on or below a ground.

The automobile charging system may further include a RFID disposed on or below the ground and a RFID reader connected with the vehicle and configured to record location information of vehicle charging through reading the RFID.

The automobile charging system may further include a light disposed under the vehicle, on/off status and color of the light indicating a current status of the photovoltaic battery panel. The controller may be configured to determine the current status of the photovoltaic battery panel according to real time image of the light captured by the camera module, and obtain and execute a second optimal charging scheme through searching in a second database.

The preset pattern may be dynamically displayed and configured to change under different conditions. The preset pattern may include a QR code. After charging begins, the pattern may change from the preset pattern to a pattern that represents the current status of the photovoltaic battery panel in real time, while the controller may be configured to obtain and execute a third optimal charging scheme, according to the pattern captured by the camera module, through searching a third database.

In another aspect, the present patent application provides an automobile charging system that includes: a photovoltaic battery panel installed on a vehicle; a camera module; a first actuating device connected with the camera module; a light source; a second actuating device connected with the light source; a light disposed under the vehicle, on/off status and color of the light indicating a current status of the photovoltaic battery panel; and a controller being connected with the camera module, the first actuating device, the light source and the second actuating device. The controller is configured to control the first actuating device to rotate, and through the first actuating device control the camera module to capture a preset pattern disposed on the vehicle. After the camera module has captured the preset pattern, the controller is configured to control the second actuating device to rotate accordingly so that the light source projects light to the photovoltaic battery panel and thereby charge the photovoltaic battery panel. The controller is configured to choose a first optimal charging scheme that is suitable to the photovoltaic battery panel based on the preset pattern captured by the camera module by analyzing the preset pattern, deriving model information of the photovoltaic battery panel from the preset pattern, searching in a first database and according to the search result obtaining and executing the first optimal charging scheme. The controller is configured to determine the current status of the photovoltaic battery panel according to real time image of the light captured by the camera module, and obtain and execute a second optimal charging scheme through searching in a second database. The preset pattern is dynamically displayed and configured to change under different conditions.

After charging begins, the pattern may change from the preset pattern to a pattern that represents the current status of the photovoltaic battery panel in real time, while the controller may be configured to obtain and execute a third optimal charging scheme, according to the pattern captured by the camera module, through searching a third database.

The automobile charging system may further include a positioning device installed on sides of the vehicle and configured to limit position of the vehicle so that the camera module is capable of capturing the preset pattern after rotating over an allowable angle while the preset pattern is disposed at the bottom of the vehicle.

In yet another aspect, the present patent application provides an automobile charging system that includes: a photovoltaic battery panel installed on a vehicle; a camera module; a first actuating device connected with the camera module; a light source; a second actuating device connected with the light source; and a controller being connected with the camera module, the first actuating device, the light source and the second actuating device, a RFID disposed on or below the ground and a RFID reader connected with the vehicle and configured to record location information of vehicle charging through reading the RFID and a light disposed under the vehicle, on/off status and color of the light indicating a current status of the photovoltaic battery panel. The controller is configured to control the first actuating device to rotate, and through the first actuating device control the camera module to capture a preset pattern disposed on the vehicle. After the camera module has captured the preset pattern, the controller is configured to control the second actuating device to rotate accordingly so that the light source projects light to the photovoltaic battery panel and thereby charge the photovoltaic battery panel. The controller is configured to choose a first optimal charging scheme that is suitable to the photovoltaic battery panel based on the preset pattern captured by the camera module by analyzing the preset pattern, deriving model information of the photovoltaic battery panel from the preset pattern, searching in a first database and according to the search result obtaining and executing the first optimal charging scheme.

The controller may be configured to determine the current status of the photovoltaic battery panel according to real time image of the light captured by the camera module, and obtain and execute a second optimal charging scheme through searching in a second database.

The preset pattern may be dynamically displayed and configured to change under different conditions. The preset pattern may include a QR code. After charging begins, the pattern may change from the preset pattern to a pattern that represents the current status of the photovoltaic battery panel in real time, while the controller may be configured to obtain and execute a third optimal charging scheme, according to the pattern captured by the camera module, through searching a third database.

The automobile charging system may further include a positioning device installed on sides of the vehicle and configured to limit position of the vehicle so that the camera module is capable of capturing the preset pattern after rotating over an allowable angle while the preset pattern is disposed at the bottom of the vehicle.

DETAILED DESCRIPTION

Reference will now be made in detail to a preferred embodiment of the automobile charging system disclosed in the present patent application, examples of which are also provided in the following description. Exemplary embodiments of the automobile charging system disclosed in the present patent application are described in detail, although it will be apparent to those skilled in the relevant art that some features that are not particularly important to an understanding of the automobile charging system may not be shown for the sake of clarity.

Furthermore, it should be understood that the automobile charging system disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
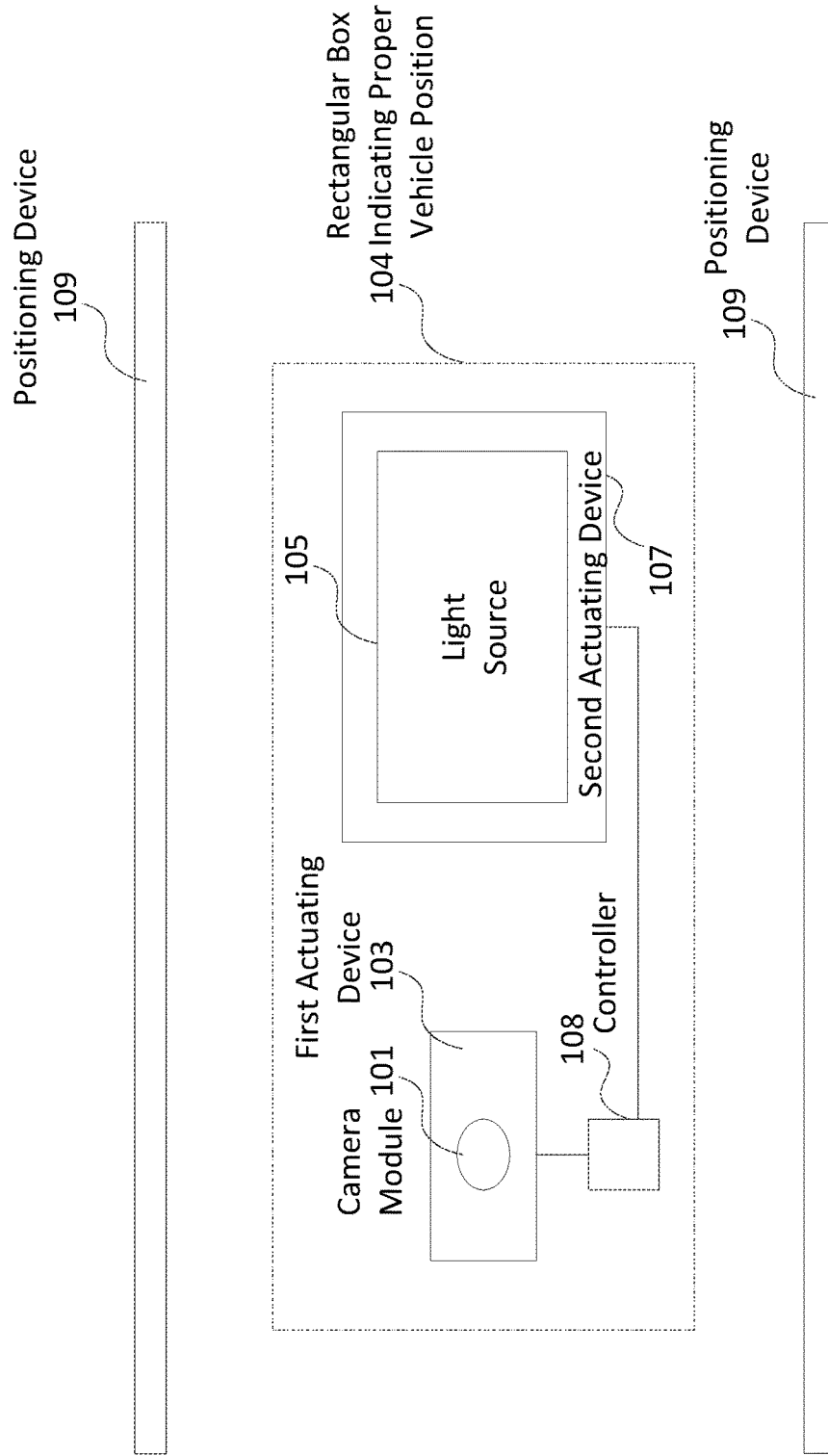
FIG. 1 is an illustrative top view of an automobile charging system in accordance with an embodiment of the present patent application.

FIG. 1 is an illustrative top view of an automobile charging system in accordance with an embodiment of the present patent application. Referring to FIG. 1, the automobile charging system includes a photovoltaic battery panel installed on a vehicle (not shown in FIG. 1), a camera module 101, a first actuating device 103 connected with the camera module 101, a light source 105, a second actuating device 107 connected with the light source 105, and a controller 108 being connected with the camera module 101, the first actuating device 103, the light source 105 and the second actuating device 107. Preferably, in this embodiment, the photovoltaic battery panel is installed at a bottom of the vehicle and the light source 105 is an infrared light source. The controller 108 is configured to control the first actuating device 103 to rotate, and through the first actuating device 103 control the camera module 101 to capture a preset pattern disposed on the vehicle. Preferably, in this embodiment, the preset pattern is disposed at the bottom of the vehicle. After the camera module 101 has captured the preset pattern disposed at the bottom of the vehicle, the controller 108 is configured to control the second actuating device 107 to rotate accordingly so that the light source 105 projects light to the photovoltaic battery panel and thereby charge the photovoltaic battery panel.

Referring to FIG. 1, the camera module 101, the first actuating device 103, the light source 105, the second actuating device 107 and the controller 108 are disposed under the vehicle, and preferably, disposed on the ground or below the ground. When these components are disposed below the ground, a layer of transparent material, such as a layer of tempered glass, may be disposed over them. The automobile charging system further includes a positioning device 109 installed on sides of the vehicle and configured to limit the position of the vehicle so that the camera module 101 is capable of capturing the preset pattern at the bottom of the vehicle after rotating over an allowable angle. In this embodiment, when the bottom of the vehicle overlaps with the rectangular box 104 in FIG. 1, the camera module 101 is capable of capturing the preset pattern at the bottom of the vehicle.

Figure 2:
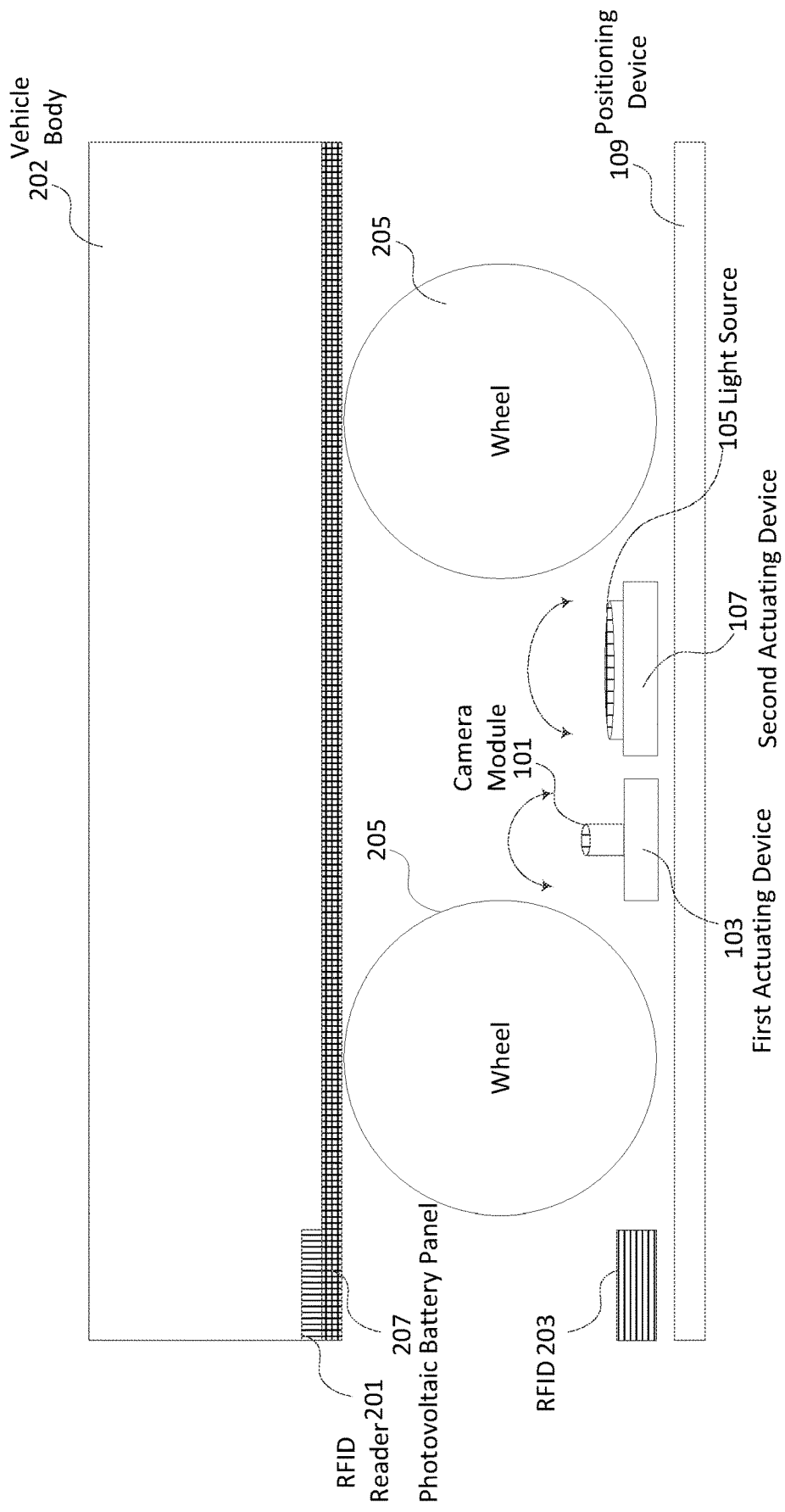
FIG. 2 is a side view of the automobile charging system depicted in FIG. 1.

FIG. 2 is a side view of the automobile charging system depicted in FIG. 1. Referring to FIG. 2, the vehicle includes a vehicle body 202 and four wheels 205. The photovoltaic battery panel 207 is installed below the vehicle body 202 and above the wheels 205. The automobile charging system further includes a RFID reader 201 and a RFID 203. In this embodiment, the RFID reader 201 is connected with the vehicle body 202, while the RFID 203 is disposed below the vehicle body 202, and preferably, disposed on or below the ground. The RFID reader 201 is configured to record location information of vehicle charging through reading the RFID 203.

Figure 3:
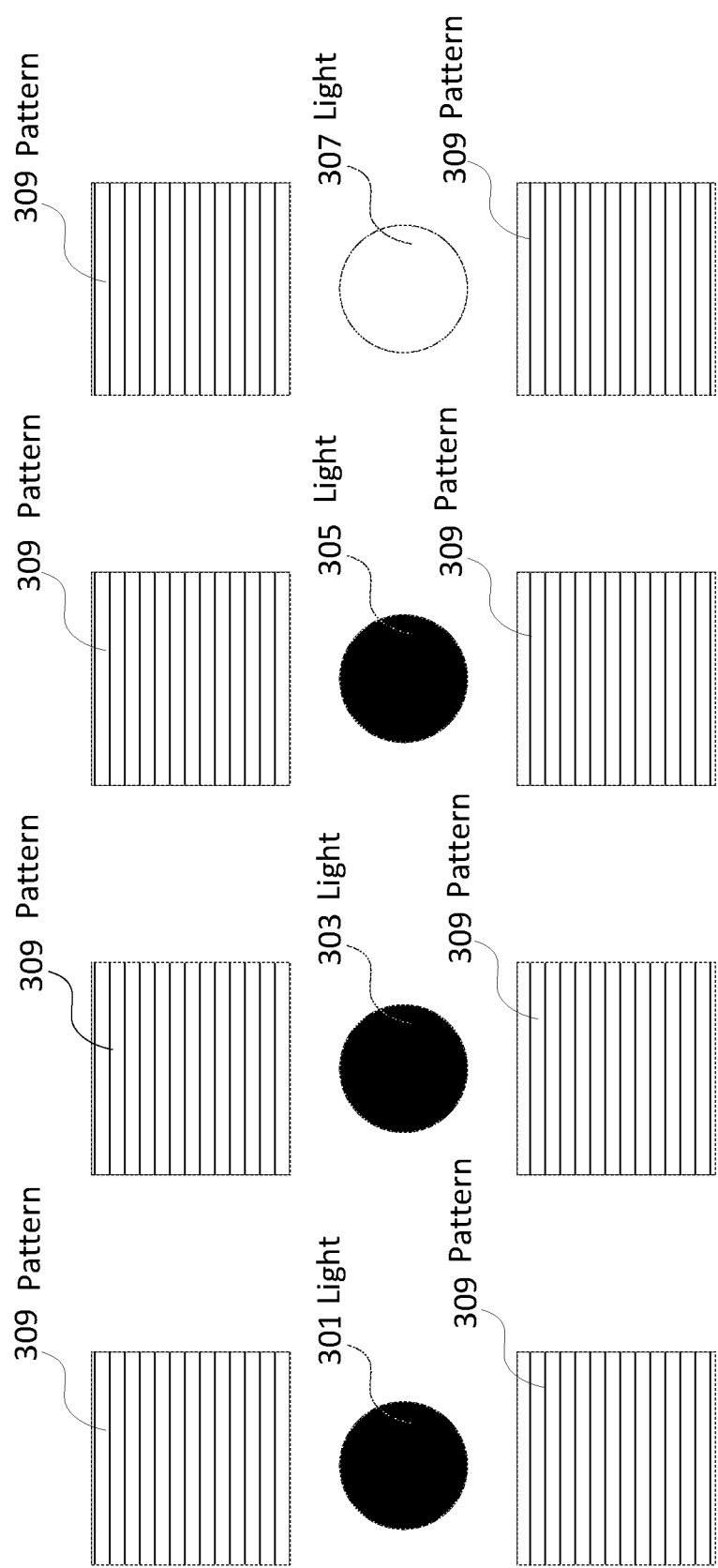
FIG. 3 illustrates preset patterns at a bottom of a vehicle in the embodiment depicted in FIG. 1.

FIG. 3 illustrates preset patterns at the bottom of the vehicle in the embodiment depicted in FIG. 1. Referring to FIG. 3, the preset pattern set includes one or multiple patterns 309 disposed at the bottom of the vehicle body 202. The pattern 309 may be a QR code. When there are multiple patterns 309, the multiple patterns 309 may be identical to each other, or different from each other. In this embodiment, the patterns 309 are dynamically displayed. In other words, the patterns 309 may change under different conditions in real time.

Referring to FIG. 3, the automobile charging system further includes one or multiple lights disposed under the vehicle body 202. Preferably, in this embodiment, the lights are LED lights. The on/off status and the color of the four lights 301-307 indicate the current status of the photovoltaic battery panel. More specifically, in this embodiment, the current status of the photovoltaic battery panel includes the remaining power and the charging status of the photovoltaic battery panel. For example, when the lights 301, 303 and 305 are red and constant on while the light 307 is off, it indicates that 25% of the total amount of power of the photovoltaic battery panel is remained, and the photovoltaic battery panel is not being charged. When the lights 301, 303 and 305 are red and constant on while the light 307 is green and blinking, it indicates that 25% of the total amount of power of the photovoltaic battery panel is remained, and the photovoltaic battery panel is being charged. It is noted that in this embodiment, the total area of the patterns 309 and the lights 301-307 is relatively very small compared to the effective area of the photovoltaic battery panel, and therefore their configuration does not affect the normal charging of the photovoltaic battery panel.

The optimal charging schemes required by different models of photovoltaic battery panels are generally different. In this embodiment, the controller 108 controls the second actuating device 107 to rotate according to the preset pattern captured by the camera module 101, so that the light source 105 projects light to the photovoltaic battery panel and thereby charges the photovoltaic battery panel. At the same time, the controller 108 is configured to choose a first optimal charging scheme that is suitable to the photovoltaic battery panel carried by the vehicle according to the preset pattern. More specifically, the controller 108 is configured to analyze the preset pattern, derive the model information of the photovoltaic battery panel, and through searching in a first database obtain and execute the first optimal charging scheme.

The photovoltaic battery panels of the same model generally requires different optimal charging schemes under different conditions. In this embodiment, the controller 108 is configured to analyze the current status of the photovoltaic battery panel according to the real time image of the lights captured by the camera module 101, and select a second optimal charging scheme that is the most suitable for the photovoltaic battery panel under the current charging status. More specifically, the controller 108 is configured to determine the current status of the photovoltaic battery panel through analyzing the real time image of the lights, and obtain and execute the second optimal charging scheme through searching in a second database.

In another embodiment, the patterns 309 are dynamically displayed. After the charging begins, the pattern 309 changes from the preset pattern to a pattern that represents the current status of the photovoltaic battery panel in real time. The controller 108 is configured to obtain and execute a third optimal charging scheme that is suitable for the photovoltaic battery panel under the current charging status, according to the pattern captured by the camera module 101, through searching a third database.

The automobile charging systems provided by the above embodiments can be conveniently installed on the road on which the vehicle is driving or slightly below the road surface. Vehicles, during driving, only need to pause for a moment to be charged. When the processing speed of the automobile charging systems is fast enough, the vehicles can be charged even when moving slowly without a full stop. Therefore this system is especially suitable to be installed in waiting area or slow moving zones at traffic lights or toll points. When using the automobile charging systems to charge vehicles, the drivers and the passengers do not need to step out of the vehicles, which is very convenient. Because photovoltaic charging is used, the automobile charging system does not generate electromagnetic radiation that is harmful to human health, and therefore the safety of the system is greatly superior than that of wireless automobile charging systems based on electromagnetic radiation.

While the present patent application has been shown and described with particular references to a number of embodiments thereof, it should be noted that various other changes or modifications may be made without departing from the scope of the present invention.

What is claimed is:

1. An automobile charging system comprising:
   a photovoltaic battery panel installed on a vehicle;
   a camera module;
   a first actuating device connected with the camera module;
   a light source;
   a second actuating device connected with the light source; and
   a controller being connected with the camera module, the first actuating device, the light source and the second actuating device; wherein:
   the controller is configured to control the first actuating device to rotate, and through the first actuating device control the camera module to capture a preset pattern on the vehicle;
   after the camera module has captured the preset pattern, the controller is configured to control the second actuating device to rotate accordingly so that the light source projects light to the photovoltaic battery panel and thereby charge the photovoltaic battery panel; and
   the controller is configured to choose a first optimal charging scheme that is suitable to the photovoltaic battery panel based on the preset pattern captured by the camera module by analyzing the preset pattern, deriving model information of the photovoltaic battery panel from the preset pattern, searching in a first database and according to the search result obtaining and executing the first optimal charging scheme.

2. The automobile charging system of claim 1, wherein the photovoltaic battery panel is installed at a bottom of the vehicle.

3. The automobile charging system of claim 1, wherein the light source is an infrared light source.

4. The automobile charging system of claim 1, wherein the preset pattern is disposed at a bottom of the vehicle.

5. The automobile charging system of claim 1, wherein the camera module, the first actuating device, the light source, the second actuating device and the controller are disposed on or below a ground.

6. The automobile charging system of claim 1 further comprising a RFID disposed on or below the ground and a RFID reader connected with the vehicle and configured to record location information of vehicle charging through reading the RFID.

7. The automobile charging system of claim 1 further comprising a light disposed under the vehicle, wherein on/off status and color of the light indicate a current status of the photovoltaic battery panel.

8. The automobile charging system of claim 7, wherein the controller is configured to determine the current status of the photovoltaic battery panel according to real time image of the light captured by the camera module, and obtain and execute a second optimal charging scheme through searching in a second database.

9. The automobile charging system of claim 1, wherein the preset pattern is dynamically displayed and configured to change under different conditions.

10. The automobile charging system of claim 9, wherein the preset pattern comprises a QR code.

11. The automobile charging system of claim 9, wherein after charging begins, the pattern changes from the preset pattern to a pattern that represents the current status of the photovoltaic battery panel in real time, while the controller is configured to obtain and execute a third optimal charging scheme, according to the pattern captured by the camera module, through searching a third database.

12. An automobile charging system comprising:
a photovoltaic battery panel installed on a vehicle;
a camera module;
a first actuating device connected with the camera module;
a light source;
a second actuating device connected with the light source;
a light disposed under the vehicle, on/off status and color of the light indicating a current status of the photovoltaic battery panel; and
a controller being connected with the camera module, the first actuating device, the light source and the second actuating device;
the controller is configured to control the first actuating device to rotate, and through the first actuating device control the camera module to capture a preset pattern disposed on the vehicle;
after the camera module has captured the preset pattern, the controller being configured to control the second actuating device to rotate accordingly so that the light source projects light to the photovoltaic battery panel and thereby charge the photovoltaic battery panel; wherein:
the controller is configured to choose a first optimal charging scheme that is suitable to the photovoltaic battery panel based on the preset pattern captured by the camera module by analyzing the preset pattern, deriving model information of the photovoltaic battery panel from the preset pattern, searching in a first database and according to the search result obtaining and executing the first optimal charging scheme;
the controller is configured to determine the current status of the photovoltaic battery panel according to real time image of the light captured by the camera module, and obtain and execute a second optimal charging scheme through searching in a second database; and
the preset pattern is dynamically displayed and configured to change under different conditions.

13. The automobile charging system of claim 12, wherein after charging begins, the pattern changes from the preset pattern to a pattern that represents the current status of the photovoltaic battery panel in real time, while the controller is configured to obtain and execute a third optimal charging scheme, according to the pattern captured by the camera module, through searching a third database.

14. The automobile charging system of claim 12 further comprising a positioning device installed on sides of the vehicle and configured to limit position of the vehicle so that the camera module is capable of capturing the preset pattern after rotating over an allowable angle while the preset pattern is disposed at the bottom of the vehicle.

15. An automobile charging system comprising:
a photovoltaic battery panel installed at on a vehicle;
a camera module;
a first actuating device connected with the camera module;
a light source;
a second actuating device connected with the light source; and
a controller being connected with the camera module, the first actuating device, the light source and the second actuating device;
a RFID disposed on or below the ground and a RFID reader connected with the vehicle and configured to record location information of vehicle charging through reading the RFID; and
a light disposed under the vehicle, on/off status and color of the light indicating a current status of the photovoltaic battery panel; wherein:
the controller is configured to control the first actuating device to rotate, and through the first actuating device control the camera module to capture a preset pattern disposed on the vehicle;
after the camera module has captured the preset pattern, the controller is configured to control the second actuating device to rotate accordingly so that the light source projects light to the photovoltaic battery panel and thereby charge the photovoltaic battery panel; and
the controller is configured to choose a first optimal charging scheme that is suitable to the photovoltaic battery panel based on the preset pattern captured by the camera module by analyzing the preset pattern, deriving model information of the photovoltaic battery panel from the preset pattern, searching in a first database and according to the search result obtaining and executing the first optimal charging scheme.

16. The automobile charging system of claim 15, wherein the controller is configured to determine the current status of the photovoltaic battery panel according to real time image of the light captured by the camera module, and obtain and execute a second optimal charging scheme through searching in a second database.

17. The automobile charging system of claim 15, wherein the preset pattern is dynamically displayed and configured to change under different conditions.

18. The automobile charging system of claim 17, wherein the preset pattern comprises a QR code.

19. The automobile charging system of claim 17, wherein after charging begins, the pattern changes from the preset pattern to a pattern that represents the current status of the photovoltaic battery panel in real time, while the controller is configured to obtain and execute a third optimal charging scheme, according to the pattern captured by the camera module, through searching a third database.

20. The automobile charging system of claim 15 further comprising a positioning device installed on sides of the vehicle and configured to limit position of the vehicle so that the camera module is capable of capturing the preset pattern after rotating over an allowable angle while the preset pattern is disposed at the bottom of the vehicle.

\* \* \* \* \*